(12) United States Patent
Matsuda et al.

(10) Patent No.: US 7,542,055 B2
(45) Date of Patent: Jun. 2, 2009

(54) IMAGE DISPLAY SYSTEM, PROJECTOR, INFORMATION STORAGE MEDIUM, AND IMAGE PROCESSING METHOD

(75) Inventors: Hideki Matsuda, Fujimi-machi (JP); Osamu Wada, Ima (JP)

(73) Assignee: Seiko Epson Corporation, Tokyo (JP)

( * ) Notice: Subject to any disclaimer, the term of this patent is extended or adjusted under 35 U.S.C. 154(b) by 411 days.

(21) Appl. No.: 10/343,429

(22) PCT Filed: May 29, 2002

(86) PCT No.: PCT/JP02/05221
§ 371 (c)(1), (2), (4) Date: Jan. 31, 2003

(87) PCT Pub. No.: WO02/097784
PCT Pub. Date: Dec. 5, 2002

(65) Prior Publication Data
US 2003/0147053 A1 Aug. 7, 2003

(30) Foreign Application Priority Data
May 31, 2001 (JP) .............................. 2001-165063
Nov. 30, 2001 (JP) .............................. 2001-366815

(51) Int. Cl.
*G09G 5/10* (2006.01)
*G06K 9/00* (2006.01)
*G03B 21/00* (2006.01)
(52) U.S. Cl. ..................... 345/690; 362/167; 353/122
(58) Field of Classification Search ................. 345/690, 345/697, 7–9, 88–89, 904; 382/167; 252/122
See application file for complete search history.

(56) References Cited

U.S. PATENT DOCUMENTS 4,952,917 A * 8/1990 Yabuuchi ..................... 345/690
5,287,173 A * 2/1994 Onuma et al. ............... 348/655
5,561,459 A * 10/1996 Stokes et al. ................ 348/180
5,739,809 A * 4/1998 McLaughlin et al. ........ 345/594

(Continued)

FOREIGN PATENT DOCUMENTS

EP    1 150 159 A1    10/2001

(Continued)

OTHER PUBLICATIONS

U.S. Appl. No. 10/019,698, filed Jan. 2, 2002, Wada.

(Continued)

*Primary Examiner*—Srilakshmi K Kumar
(74) *Attorney, Agent, or Firm*—Oliff & Berridge, PLC

(57) ABSTRACT

An image display system that performs grayscale correction in accordance with the on-site environment, to display an image, is provided with: a calibration signal generation section (150) that generates calibration signals for displaying each of first and second grayscale correction images having two grayscale values of a single color, a color-light sensor (60) that measures luminance values under an ideal environment and the on-site environment for each of the first and the second grayscale correction images projected on a screen, a 1D-LUT generation section (140) that generates a 1D-LUT based on the luminance values measured by the color-light sensor (60), and a grayscale correction section (170) that stores the 1D-LUT generated by the 1D-LUT generation section (140) and performs grayscale correction.

24 Claims, 7 Drawing Sheets

U.S. PATENT DOCUMENTS

| | | | |
|---|---|---|---|
| 5,760,843 A * | 6/1998 | Morimura et al. | 348/678 |
| 6,522,313 B1 * | 2/2003 | Cottone | 345/22 |
| 6,611,249 B1 * | 8/2003 | Evanicky et al. | 345/102 |
| 6,618,076 B1 * | 9/2003 | Sukthankar et al. | 348/180 |
| 6,677,958 B2 * | 1/2004 | Cottone et al. | 345/589 |
| 6,775,633 B2 * | 8/2004 | Edge | 702/107 |
| 2002/0015043 A1 | 2/2002 | Matsuda | |
| 2002/0048084 A1 | 4/2002 | Matsuda | |
| 2002/0051001 A1 | 5/2002 | Kanai | |
| 2002/0051121 A1 | 5/2002 | Kanai | |
| 2002/0057374 A1 | 5/2002 | Suzuki | |
| 2002/0057835 A1 | 5/2002 | Wada | |
| 2002/0089611 A1 | 7/2002 | Kim | |
| 2002/0153472 A1 | 10/2002 | Yano | |

FOREIGN PATENT DOCUMENTS

| | | |
|---|---|---|
| EP | 1 189 434 A2 | 3/2002 |
| EP | 1 189 458 A2 | 3/2002 |
| EP | 1 349 387 A2 | 10/2003 |
| GB | 2 335 326 A | 9/1999 |
| JP | A 4-136925 | 5/1992 |
| JP | A 7-44111 | 2/1995 |
| JP | A 8-79546 | 3/1996 |
| JP | A 9-18806 | 1/1997 |
| JP | A 9-37091 | 2/1997 |
| JP | A 10-271352 | 10/1998 |
| JP | A 11-146232 | 5/1999 |
| JP | A 11-234539 | 8/1999 |
| JP | A 11-316566 | 11/1999 |
| JP | A 2002-125125 | 4/2002 |
| JP | A 2002-152552 | 5/2002 |
| JP | A 2002-202771 | 7/2002 |
| JP | A 2002-247401 | 8/2002 |
| JP | A 2002-281520 | 9/2002 |
| JP | A 2002-311503 | 10/2002 |

OTHER PUBLICATIONS

U.S. Appl. No. 10/031,441, filed Jan. 22, 2002, Wada.
U.S. Appl. No. 10/111,323, filed Apr. 24, 2002, Wada.
U.S. Appl. No. 10/111,321, filed Apr. 24, 2002, Wada.
U.S. Appl. No. 10/111,357, filed Apr. 24, 2002, Wada et al.

* cited by examiner

IMAGE DISPLAY SYSTEM, PROJECTOR, INFORMATION STORAGE MEDIUM, AND IMAGE PROCESSING METHOD

TECHNICAL FIELD

The present invention relates to an image display system, a projector, an information storage medium, and an image processing method.

BACKGROUND OF ART

The present invention provides an image display system that displays a calibration image, then measures that calibration image and corrects the image signal accordingly, in order to reproduce a target color (such as a color that conforms to a ruleset such as sRGB) in a manner that conforms to the environment used in practice.

In a method that could be considered, by way of example, the image display system displays and measures calibration images for each predetermined grayscale in each of the red (R), green (G), blue (B), and white (W) colors.

However, this method takes a lot of time for the image display system to measure the colors and generate correction data (such as a one-dimensional look-up table) for correcting the image signal, and the quantity of correction data is also large.

One method of reducing the quantity of this correction data is disclosed in Japanese Patent Application Laid-Open No. 10-271352, by way of example, which refers to a method of performing gamma correction on pattern data for color correction by switching among a plurality of gamma conversion curves.

However, this document does not address the technical problem of increasing speed. That is because the application of this document is the representation of colors as subtractive colors in devices such as scanner, and it does not refer to devices that represent colors as additive colors, with is a prerequisite for image display.

In other words, factors such as ambient light have an effect on additive colors, which affects the reproduced colors.

In situations such as a presentation at a client's location, in particular, it is necessary for the presenter to set up the projector at that site and immediately display images that are suited to the environment in which the projector is used.

Since factors such as of ambient light change a reproduced image appearance, it is necessary for the image display system to perform grayscale correction.

However, a phenomenon called deteriorated tone-mapping of highlight details occurs if the output grayscale values are too high, whereas a phenomenon called deteriorated tone-mapping of shadow details occurs if the output grayscale values are too low, so it is necessary for the image display system to perform the grayscale correction in an appropriate manner.

DISCLOSURE OF INVENTION

The present invention was devised in the light of the above-described technical problems, and may provide an image display system, a projector, an information storage medium, and an image processing method that are capable of performing grayscale correction more rapidly during calibration.

The present invention may also provide an image display system, a projector, an information storage medium, and an image processing method that can perform grayscale correction that is appropriate for the on-site environment.

(1) In order to solve the above-described technical problems, an image display system in accordance with the present invention relates an image display system comprising:

image display means for displaying a first calibration image having a first grayscale value of a single color and a second calibration image having a second grayscale value of the single color, the first grayscale value and the second grayscale value being different from eachother;

environment determination means for capturing the first and second calibration images so as to generate first and second information corresponding to the respective first and second calibration images displayed on a display area under viewing environment; and grayscale correction means for performing grayscale correction based on a first difference between the first and second information, and based on a second difference between third and fourth information, the third and fourth information corresponding to the respective first and second calibration images displayed on an area under predetermined environment.

(2) An image display system in accordance with the present invention also relates to an image display system comprising:

an image display section displays a first calibration image having a first grayscale value of a single color and a second calibration image having a second grayscale value of the single color, the first grayscale value and the second grayscale being different from each other;

an environment determination section captures the first and second calibration images so as to generate first and second information corresponding to the respective first and second calibration images displayed on a display area under viewing environment; and a grayscale correction section performs grayscale correction, based on a first difference between the first and second information, and based on a second difference between third and fourth information, the third and fourth information corresponding to the respective first and second calibration images displayed on an area under predetermined environment.

(3) A projector in accordance with the present invention relates to a projector comprising:

image display means for projecting a first calibration image having a first grayscale value of a single color and a second calibration image having a second grayscale value of the single color, the first grayscale value and the second grayscale value being different from each other;

environment determination means for capturing the first and second calibration images so as to generate first and second information corresponding to the respective first and second calibration images projected on a display area under viewing environment; and grayscale correction means for performing grayscale correction based on a first difference between the first and second information, and based on a second difference between third and fourth information, the third and fourth information corresponding to the respective first and second calibration images projected on an area under predetermined environment.

(4) A projector in accordance with the present invention also relates to a projector comprising:

an image display section projects a first calibration image having a first grayscale value of a single color and a second calibration image having a second grayscale value of the single color, the first grayscale value and the second grayscale value being different from eachother;

an environment determination section captures the first and second calibration images so as to generate first and second information corresponding to the respective first and second calibration images projected on a display area under viewing environment; and a grayscale correction section performs grayscale correction, based on a first difference between the first and second information, and based on a second difference between the third and fourth information, the third and fourth information corresponding to the respective first and second calibration images projected on an area under predetermined environment.

(5) A information storage medium in accordance with the present invention relates to a computer-readable information storage medium storing a program causing a computer to function as:

display control means for causing image display means to display a first calibration image having a first grayscale value of a single color and a second calibration image having a second grayscale value of the single color, the first grayscale value and the second grayscale value being different from each other;

environment determination means for capturing the first and second calibration images so as to generate first and second information corresponding to the respective first and second calibration images displayed on a display area under viewing environment; and grayscale correction means for performing grayscale correction, based on a first difference between the first and second information, and based on a second difference between third and fourth information, the third and fourth information corresponding to the respective first and second calibration images displayed on an area under predetermined environment.

Since a conventional image display system repeats the processings of displaying a calibration image at each of predetermined grayscales, measuring colors, and storing measured-color data, calibration and grayscale correction in particular takes some time.

The present invention makes it possible for an image display system or the like to clearly determine just how much the actual on-site environment differs from an ideal environment, by comparing a difference within environmental information for two different grayscale under the on-site environment and a difference within environmental information for those two different grayscales under an ideal environment.

In this manner, the present invention makes it possible for the image display system or the like to perform even faster grayscale correction, because the calibration image used in grayscale correction is divided into two grayscales. This therefore enables the image display system to perform even faster calibration.

(6) An image display system in accordance with the present invention relates to an image display system comprising:

image display means for displaying calibration images;

environment determination means capturing the calibration images so as to generate first environmental information corresponding to the calibration images displayed on a display area under viewing environment; and grayscale correction means for performing grayscale correction, based on wherein the grayscale correction means performs gamma processing for the grayscale correction, using different gamma parameters for a lower grayscale region and a higher grayscale region, based on the first environmental information, and based on second environmental information corresponding to the calibration images displayed on an area under predetermined environment, in such a manner that a width of increase of output values is relatively greater in the lower grayscale region than in the higher grayscale region.

(7) An image display system in accordance with the present invention relates to an image display system comprising:

an image display section displays calibration images;

an environment determination section captures the calibration images so as to generate first environmental information corresponding to the calibration images displayed on a display area under viewing environment; and a grayscale correction section performs grayscale correction, wherein the grayscale correction section performs gamma processing for the grayscale correction, using different gamma parameters for a lower grayscale region and a higher grayscale region, based on the first environmental information, and based on second environmental information corresponding to the calibration images displayed on an area under predetermined environment, in such a manner that a width of increase of output values is relatively greater in the lower grayscale region than in the higher grayscale region.

(8) A projector in accordance with the present invention relates to a projector comprising:

image display means for projecting calibration images;

environment determination means for capturing the calibration images so as to generate first environmental information corresponding to the calibration images displayed on a display area under viewing environment; and grayscale correction means for performing grayscale correction, based on, wherein the grayscale correction means performs gamma processing for the grayscale correction, using different gamma parameters for a lower grayscale region and a higher grayscale region, based on the first environmental information, and based on second environmental information corresponding to the calibration images displayed on an area under predetermined environment, in such a manner that a width of increase of output values is relatively greater in the lower grayscale region than in the higher grayscale region.

(9) A projector in accordance with the present invention relates to a projector comprising:

an image display section projects calibration images;

an environment determination section captures the calibration images so as to generate first environmental information corresponding to the calibration images displayed on a display area under viewing environment; and a grayscale correction section performs grayscale correction, wherein the grayscale correction section performs gamma processing for the grayscale correction, using different gamma parameters for a lower grayscale region and a higher grayscale region, based on the first environmental information, and based on second environmental information corresponding to the calibration images displayed on an area under predetermined environment, in such a manner that a width of increase of output values is relatively greater in the lower grayscale region than in the higher grayscale region.

(10) An information storage medium in accordance with the present invention relates to a computer-readable information storage medium storing a program causing a computer to function as:

display control means for causing image display means to display calibration images;

environment determination means capturing the calibration images so as to generate first environmental information corresponding to the calibration images displayed on a display area under viewing environment; and grayscale correction means for performing grayscale correction, wherein the grayscale correction means performs gamma processing for the grayscale correction, using different gamma parameters for a lower grayscale region and a higher grayscale region, based on the first environmental information, and based on second environmental information corresponding to the calibration images displayed on an area under predetermined environment, in such a manner that a width of increase of output values is relatively greater in the lower grayscale region than in the higher grayscale region.

The present invention makes it possible for an image display system or the like to perform suitable grayscale correction, by causing changes in the output values in such a manner that the width of increase of output values is relatively greater in the lower grayscale region than in the higher grayscale region.

With an image display system in general, a phenomenon called deteriorated tone-mapping of highlight details is likely to occur in the higher grayscale regions if the output values are too high, but it is necessary to increase the output values because the effects of artificial light tends to cause a phenomenon called deteriorated tone-mapping of shadow details in the lower grayscale regions. For that reason, the image display system or the like can provide suitable grayscale correction by changing the width of increase of the output values in accordance with the grayscale value.

(11) In this image display system, projector, and information storage medium, where at least some of the gamma parameters are such that, constants are A and B, an output grayscale is Y, an input grayscale is X, a gamma value of the lower grayscale region is $\gamma L$, and a gamma value of grayscale regions other than the lower grayscale region is $\gamma H$; $Y=A^{\gamma L}$ may be applied for the lower grayscale region, $Y=BX^{\gamma H}$ may be applied for the higher grayscale region, $\gamma L$ may be a value less than 1, and $\gamma H$ may be a value equal to or greater than 1.

This makes it possible for an image display system or the like to perform suitable grayscale correction, by causing changes in the output values in such a manner that the width of increase of output values is relatively greater in the lower grayscale region than in the higher grayscale region.

(12) In this image display system, projector, and information storage medium, the first and second grayscale values may be less than a half value of an entire grayscale range.

By using a calibration image at a lower grayscale value in this manner, it becomes possible for an image display system or the like to determine settings that are more suitable for the on-site environment more appropriately. This is because changes in color in the lower grayscale regions are greater than changes in color at the higher grayscale regions.

(13) In this image display system, projector, and information storage medium, the first, second, third and fourth information may be expressed as luminance values; and the first difference and the second difference may be expressed as ratios of luminance values.

Particularly when a front-projection type of display device is used as the image display system, the effects of ambient light such as artificial light or the like on the projected image are dependent not on the ambient light alone, but also on the properties of the projection surface (such as its partial light reflectivity) and the projection distance. In such a case, an image display system or the like can determine changes in the environment more appropriately by determining how much change there is from an ideal value of a luminance value between two grayscales on the projection surface, using luminance values rather than using illumination as environmental information.

(14) In this image display system, projector, and information storage medium, the grayscale correction means may comprise:

means for generating a one-dimensional look-up table, based on the first difference; and means for performing gamma processing for the grayscale correction, based on the thus-generated one-dimensional look-up table.

This makes it possible for an image display system or the like to generate a one-dimensional look-up table that is suited to the on-site environment, and perform grayscale correction that is suited to the on-site environment, by performing gamma processing for the grayscale correction, based on that look-up table.

(15) Note that the means for performing gamma processing for the grayscale correction in this case may use different gamma parameters for the lower grayscale region and the higher grayscale region, in such a manner that a width of increase of output values is relatively greater in the lower grayscale region than in the higher grayscale region based on the first environmental information, and based on the second environmental information corresponding to the calibration images displayed on an area under predetermined environment.

This makes it possible for an image display system or the like to perform suitable grayscale correction, by changing the output values in such a manner that the width of increase of output values is relatively greater in the lower grayscale region than in the higher grayscale region.

With an image display system in general, a phenomenon called deteriorated tone-mapping of highlight details is likely to occur in the higher grayscale regions if the output values are too high, but it is necessary to increase the output values because the effects of artificial light tends to cause a phenomenon called deteriorated tone-mapping of shadow details in the lower grayscale regions. For that reason, the image display system or the like can provide suitable grayscale correction by changing the width of increase of the output values in accordance with the grayscale value.

(16) This image display system and projector may further comprise:

color conversion means for performing color conversion, the image display means may display the calibration images in R-color, G-color, B-color and white color each having a predetermined grayscale value, one of the calibration images in R-color, G-color, B-color; and white color may be one of the first calibration image and the second calibration image;

the environment determination means may captures the calibration images in R-color, G-color, B-color; and white color so as to generate respective color information corresponding to the calibration images in R-color, G-color, B-color and white color displayed on the display area under the viewing environment, and the color conversion means may perform the color conversion based on the respective color information.

(17) The information storage medium may further store:

a program for causing a computer to function as color conversion means for performing color conversion, the display control means may cause the image display means to display the calibration images in R-color, G-color, B-color and white color each having a predetermined grayscale value, and one of the calibration images in R-color, G-color, B-color; and white color, may be one of the first calibration image and the second calibration image, the environment determination means may captures the calibration images in R-color, G-color, B-color and white color so as to generate respective color information corresponding to the calibration images in R-color, G-color, B-color and white color displayed on the display area under the viewing environment, and the color conversion means may perform the color conversion based on the respective color information.

This makes it possible for an image display system or the like to perform processing such as grayscale correction by using four different calibration images in the creation of the color conversion data and two different calibration images in the creation of the grayscale correction data (of which one can be used in common for the color conversion).

It is therefore sufficient to display a calibration image, measure it, and store the measurement data five times, so that the image display system or the like can perform the calibration more rapidly.

Note that the measured-color information could be tristimulus values (such as XYZ values) from color measurement, color information that leads to those tristimulus values (such as RGB values that can be converted into XYZ values), or color information derived from those tristimulus values (such as xy values that are a type of chromaticity value), by way of example.

(18) This image display system and the projector may further comprise:

color conversion means for performing color conversion, wherein the image display means may display the calibration images for the color conversion in R-color, G-color, B-color and white color each having a higher grayscale value, the environment determination means captures the calibration images for the color conversion in R-color, G-color, B-color and white color so as to generate first and second information corresponding to the respective first and second calibration images displayed on the display area under viewing environment, and the color conversion means may generate the color conversion data, based on the measured-color information from the environment determination means, and may perform the color conversion, based on the respective color information.

(19) The information storage medium may further store:

a program for causing a computer to function as color conversion means for performing color conversion, wherein the display control means may cause the image display means to display the calibration images for the color conversion in R-color, G-color, B-color and white color each having a higher grayscale value, the environment determination means may capture the calibration images for the color conversion in R-color, G-color, B-color and white color is displayed, so as to generate first and second information corresponding to the respective first and second calibration images displayed on the display area under viewing department, and the color conversion means may generate the color conversion data, based on the measured-color information from the environment determination means, and may perform the color conversion, based on the respective color information the grayscale correction means may perform the grayscale correction on image information that has been subjected to the color conversion, based on the luminance values from the environment determination means.

This makes it possible for an image display system or the like to perform processing such as grayscale correction by using four different calibration images in the creation of the color conversion data and two different calibration images in the creation of the grayscale correction data.

It is therefore sufficient to display a calibration image, measure it, and store the measurement data six times, so that the image display system or the like can perform the calibration more rapidly.

The image display system or the like can also perform color conversion that preserves the maximum color gamut of the projector or the like as much as possible, by using calibration images for color conversion at a higher grayscale value.

Furthermore, the image display system or the like can perform more suitable grayscale correction, by using calibration images for grayscale correction at two lower grayscale values, since this makes it possible to capture the effects of ambient light more clearly than when a calibration image for grayscale correction at a higher grayscale value is used.

(20) An image processing method in accordance with the present invention relates to an image processing method comprising the steps of:

displaying calibration images for color conversion in different colors;

capturing the calibration images in different colors so as to generate respective color information corresponding to the calibration images for the color conversion;

displaying a first calibration image having a first grayscale value of a single color and a second calibration image having a second grayscale value of the single color, the first grayscale value and the second grayscale value being different from each other for performing grayscale correction;

generating first and second information corresponding to the respective first and second calibration images displayed on a display area under viewing environment and third and fourth information corresponding to the respective first and second calibration images displayed on an area under predetermined environment, the first, second, third and fourth information being expressed as luminance values;

performing the grayscale correction, based on on a first difference between the first and second information, and based on a second difference between the third and fourth information, the first difference and second difference being expressed as ratios of luminance values.

The present invention makes it possible for an image display system or the like to perform processing such as the grayscale correction by using the calibration images for the grayscale correction having two different grayscale values.

The image display system or the like can therefore perform the calibration faster than in a case in which a calibration image is displayed, colors are measured, and measured-color data is processed for each predetermined grayscale values.

Note that in this image display system, projector, information storage medium, and image processing method, the color conversion data could be a matrix for color conversion or a three-dimensional look-up table, by way of example. If color conversion is done by using a matrix for color conversion, for example, the color conversion can be done faster than when a three-dimensional look-up table is used for the color conversion.

(21) An image processing method in accordance with the present invention relates to an image processing method comprising the steps of:

displaying calibration images for grayscale correction;

determining luminance values of the thus-displayed calibration images for the grayscale correction; and performing gamma processing for the grayscale correction, using different gamma parameters for a lower grayscale region and a higher grayscale region, based on first environmental information that is based on a luminance value that is determined when the calibration images are displayed under predetermined environment and second environmental information that is based on a luminance value that is determined when the calibration images are displayed under viewing environment, in such a manner that a width of increase of output values is relatively greater in the lower grayscale region than in the higher grayscale region, wherein, where at least some of the gamma parameters are such that, constants are A and B, an output grayscale is Y, an input grayscale is X, a gamma value of the lower grayscale region is γL, and a gamma value of grayscale regions other than the lower grayscale region is γH; $Y=AX^{\gamma L}$ is applied for the lower grayscale region, $Y=BX^{\gamma H}$ is applied for the higher grayscale region, γL is a value less than 1, and γH is a value equal to or greater than 1.

The present invention makes it possible for an image display system or the like to perform suitable grayscale correction, by causing changes in the output values in such a manner that the width of increase of output values is relatively greater in the lower grayscale region than in the higher grayscale region.

In this manner, the image display system or the like can perform grayscale correction in a more appropriate manner, by using different widths of increase of the output values, depending on the grayscale value.

BEST MODE FOR CARRYING OUT THE INVENTION

The description below relates to a case in which the present invention is applied to an image processing system which uses a liquid-crystal project or to project an image, by way of example, with reference to the accompanying figures. It should be noted that the embodiments described below do not in any way limit the scope of the present invention as laid out in the claims herein. In addition, the entirety of the configuration described with reference to these embodiments is not limited to being essential means for the invention as laid out in the claims herein.

Description of Overall System

Figure 1:
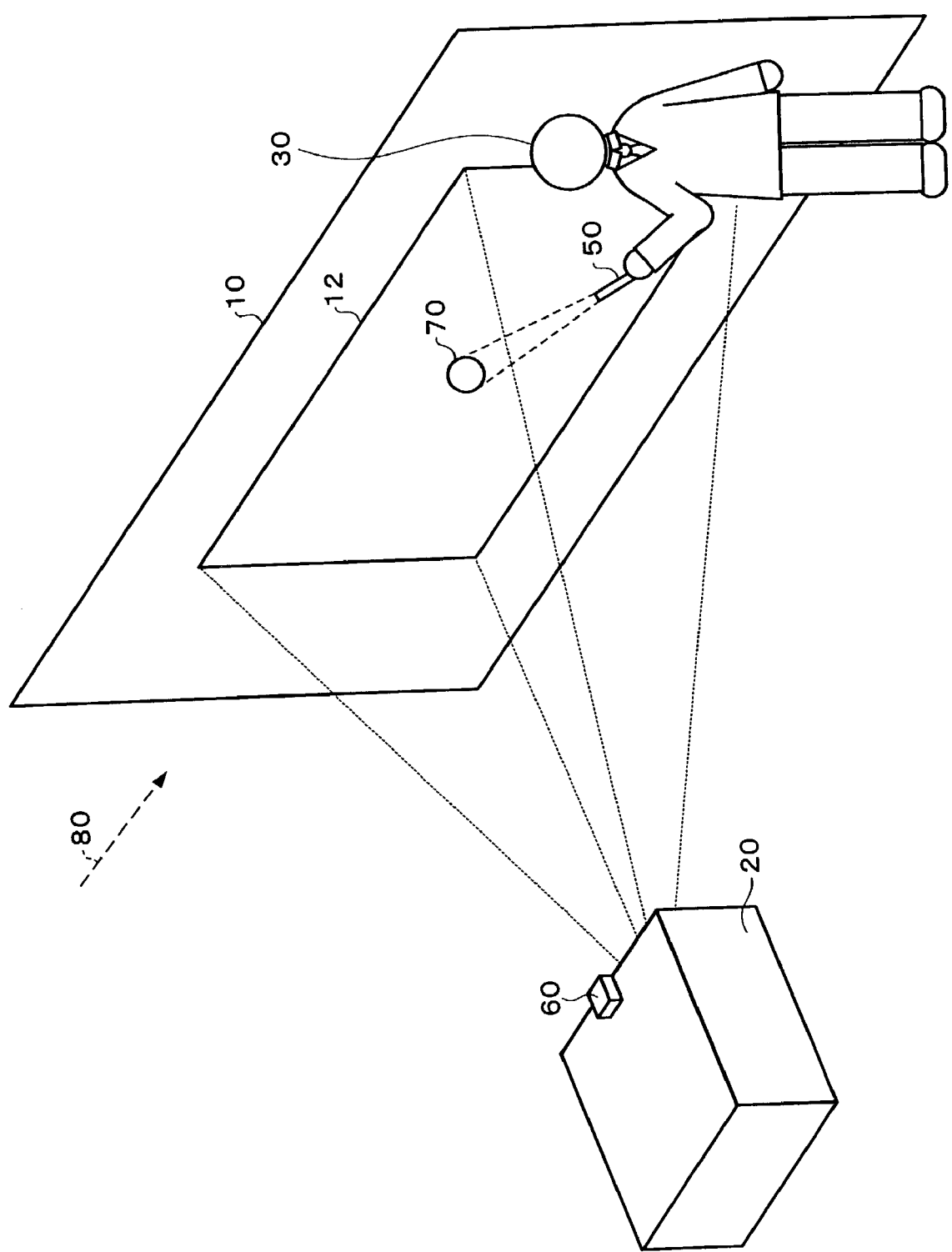
FIG. 1 is a schematic illustrative view of an image display system in accordance with an example of this embodiment.

A schematic illustrative view shown in FIG. 1 is of an image display system in accordance with an example of this embodiment of the present invention.

A projector 20, which is a projection type of display device provided substantially facing a screen 10, projects an image for a predetermined presentation. A presenter 30 gives a presentation to an audience, while using a light spot 70 projected from a laser pointer 50 to point at a desired position of an image in an the image display region 12, which is a display area on the screen 10.

During such a presentation, image appearances on the image display region 12 will vary greatly, depending on ambient light 80 (such as artificial light or external light). Even when the projector 20 displays the same white, for example, it could seem to be white with a yellow cast or white with a blue cast, depending on the type of the screen 10. Similarly, the display of the same white by the projector 20 could seem to be a bright white or a dull white if the ambient light 80 differs.

Recently, the projector 20 of this type has become smaller and easy to transport. For that reason, it has become possible for the presenter 30 to give presentations at a client's location, by way of example, but it is difficult to adjust colors to match the environment at the client's location and the manual adjustment of colors at the client's location takes too much time.

A method of color measurement that is considered for the image display system involves displaying a calibration image for each of the red (R), green (G), blue (B), and white (W) colors at each of predetermined grayscale values, when displaying calibration images for color adjustment.

Such a method, however, has a disadvantage in that the image display system takes a long time to measure the colors and generate the correction data (such as a one-dimensional look-up table, which is hereinafter abbreviated to 1D-LUT) for correcting the image signal, and a large amount of correction data is required.

With this embodiment of the present invention, the projector 20 displays four calibration images for color conversion at the highest grayscale in each of the red (R), green (G), blue (B), and white (W) colors as calibration images, to calibrate the color conversion. With this embodiment, the projector 20 displays calibration images for grayscale correction in white (W) at two different grayscales in the lower grayscale region as calibration images, to calibrate the grayscale correction.

In this manner, the projector 20 can set a maximum limit on the color gamut that can be reproduced, by using colors at the highest grayscale for the color conversion. The projector 20 can easily determine any change in brightness due to a change in the ambient light 80, by using a color at a lower grayscale for the grayscale correction. This is because the lower grayscale region is more readily affected by the ambient light 80 than the higher grayscale region.

The description now turns to the functional blocks of the projector image processing section within the projector 20 in accordance with an example of this embodiment.

Figure 2:
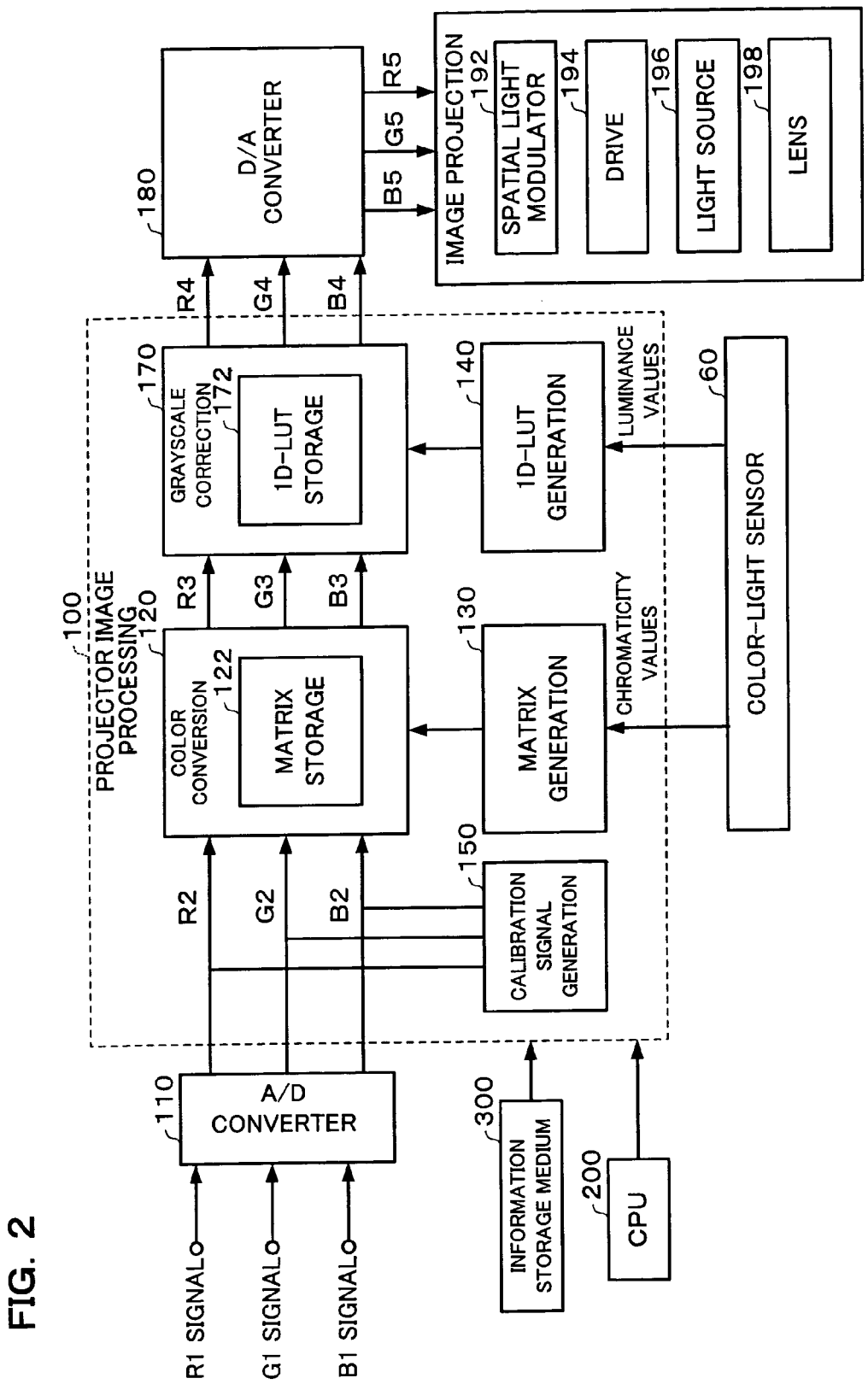
FIG. 2 is a functional block diagram of the projector image processing section within the projector in accordance with this example.

An example of the functional blocks of the projector image processing section 100 within the projector 20 in accordance with an example of this embodiment is shown in FIG. 2.

The projector 20 inputs an R1 signal, a G1 signal, and a B1 signal, which form RGB signals in analog format that are sent from a personal computer (PC) or the like, to an A/D converter section 110. The projector image processing section 100 is controlled by a CPU 200 to convert the R1 signal, G1 signal, and B1 signal into digital form, and input an R2 signal, a G2 signal, and a B2 signal in digital form to the projector image processing section 100.

The projector image processing section 100 comprises a calibration signal generation section 150 used for displaying a calibration image, a color conversion section 120, and a grayscale correction section 170.

The projector image processing section 100 also comprises a matrix generation section 130, which generates a matrix for color conversion that is a type of color conversion data, based on measured-color information from a color-light sensor 60, and a one-dimensional look-up table (1D-LUT) generation section 140 that generates a 1D-LUT based on a luminance value from the color-light sensor 60.

The thus-generated matrix for color conversion is stored in a matrix storage section 122 of the color conversion section 120. The thus-generated 1D-LUT is stored in a 1D-LUT storage section 172 in the grayscale correction section 170.

The color conversion section 120 takes the R2 signal, G2 signal, and B2 signal and converts them into an R3 signal, G3 signal, and B3 signal in such a manner as to reproduce colors that have been suited to the on-site environment, based on the matrix for color conversion stored in the matrix storage section 122.

The grayscale correction section 170 converts the R3 signal, G3 signal, and B3 signal that have been subjected to color conversion into the R4 signal, G4 signal, and B4 signal, in such a manner that grayscales are reproduced to suit the on-site environment, based on the 1D-LUT stored in the 1D-LUT storage section 172.

A D/A converter section 180 takes the R4 signal, G4 signal, and B4 signal that have been subjected to the color conversion and grayscale correction, and converts them into an R5 signal, G5 signal, and B5 signal in analog form.

An image projection section 190 is part of the image display means. The image projection section 190 comprises a spatial light modulator 192, a drive section 194, a light source 196, a lens 198. The drive section 194 drives the spatial light modulator 192, based on the R5 signal, G5 signal, and B5 signal from the D/A converter section 180. The image projection section 190 projects light from a light source 196 through the spatial light modulator 192 and the lens 198.

Description of Processing Flow

An example of the flow of image processing during calibration in this case will now be described.

Figure 3:
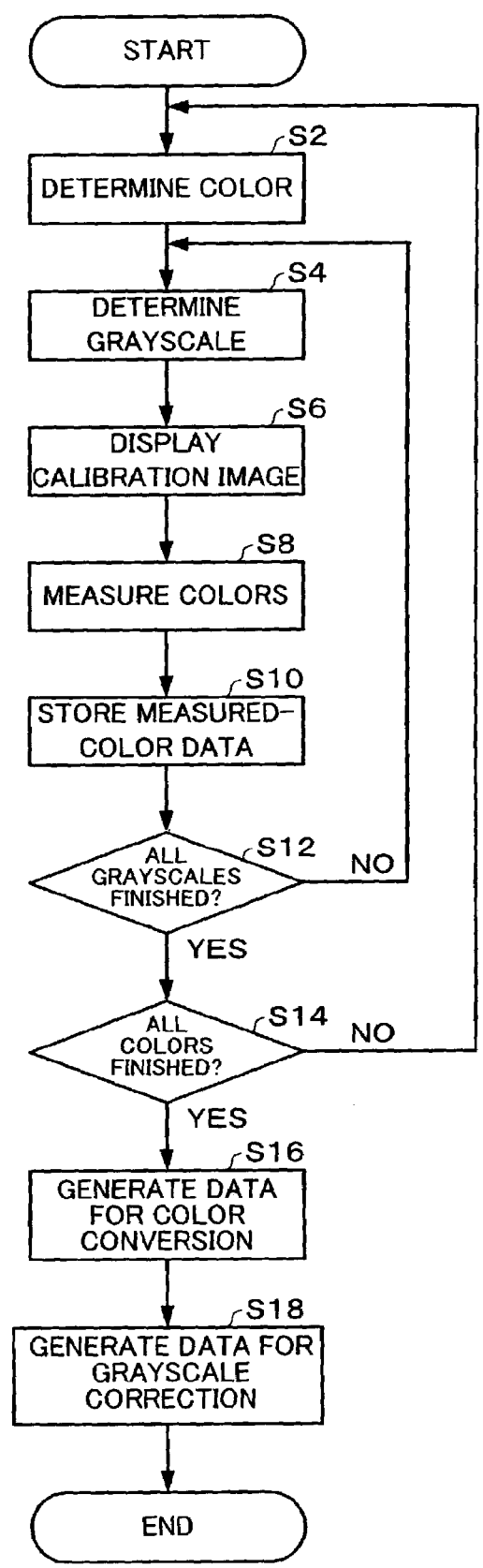
FIG. 3 is a flowchart of image processing in accordance with the prior art.

A flowchart of this example of the flow of image processing is shown in FIG. 3.

First of all, the image processing device of this example determines which of the R, G, B, and W colors to display (step S2).

The image processing device determines which grayscale to use, of the thus-determined color (step S4).

The image processing device then displays a calibration image of the thus-determined color and grayscale (step S6).

The image processing device measures the color of the thus-displayed calibration image (step S8) and stores measured-color data (step S10).

The image processing device repeats the processing of steps S4 to S10 until the measurement of grayscale calibration images is finished (step S12).

The image processing device repeats the color measurement processing (steps S4 to S12) for all these grayscale calibration images until the color measurement of the calibration images of all colors is finished (step S14).

Once all of the necessary measured-color data has been collected, the image processing device generates data for color conversion (step S16) and grayscale correction data (step S18).

In this manner, this could be considered to be a method in which the same calibration images are used in common during color conversion and grayscale correction, forming the double-loop process shown in FIG. 3. However, the display of calibration images and measurement of colors by this method takes several minutes.

The description now turns to the flow of image processing during calibration with this embodiment.

Figure 4:
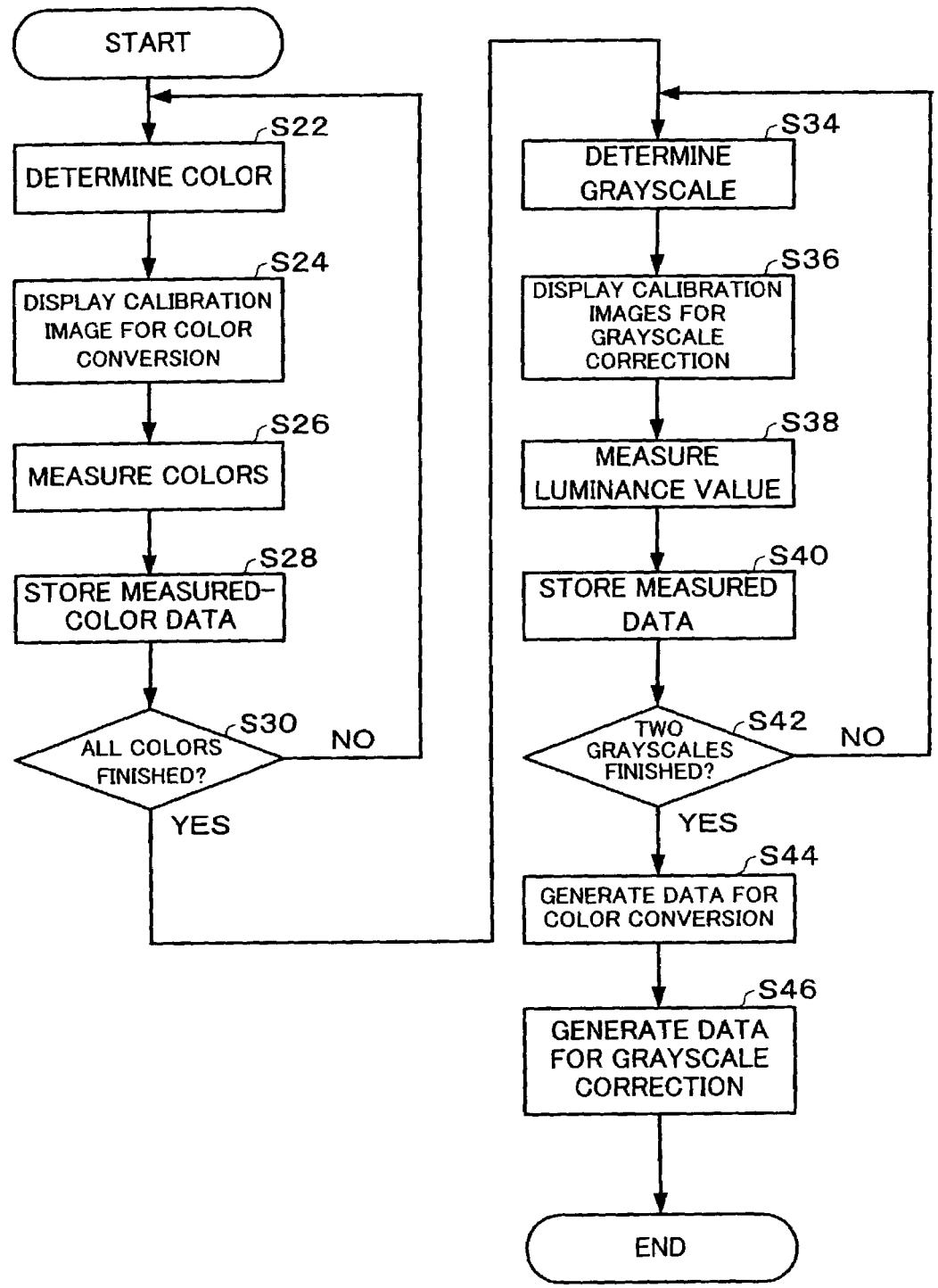
FIG. 4 is a flowchart of image processing in accordance with an example of this embodiment.

A flowchart of image processing in accordance with an example of this embodiment is shown in FIG. 4.

The description first concerns the flow of color conversion processing.

In the initial state, the matrix for color conversion within the matrix storage section 122 and the 1D-LUT within the 1D-LUT storage section 172 are set to their initial values.

First of all, the calibration signal generation section 150 determines whether to display the calibration image for color conversion for one of the R, G, B, and W colors (step S22), and generates calibration signals (R2, G2, and B2) in such a manner that an image of the highest grayscale value is displayed in the thus-determined color.

The color conversion section 120 uses the matrix for color conversion that has been set to its initial values to perform color conversion, and outputs the R3 signal, G3 signal, and B3 signal. The grayscale correction section 170 uses the 1D-LUT that has been set to its initial values to perform grayscale correction, and outputs the R4 signal, G4 signal, and B4 signal.

The projector 20 projects a calibration image for color conversion based on the RGB signals that are output through the D/A converter section 180 and the image projection section 190 (step S24).

The color-light sensor 60 performs color measurement on the calibration image for color conversion that has been projected on the screen 10 (step S26).

The matrix generation section 130 stores the measured-color data (XYZ values), based on the measured-color information from the color-light sensor 60 (step S28). Note that in this case, tristimulus values (such as XYZ values) from color measurement, color information that leads to those tristimulus values (such as RGB values that can be converted into XYZ values), or color information derived from those tristimulus values (such as xy values that are a type of chromaticity value) could be used as the measured-color information.

The projector 20 repeats these color measurements (steps S22 to S30) until it has finished the color measurement processing of the calibration images for color conversion for all of the colors (step S30). Note that this color measurement processing (steps S22 to S30) is performed four times since there are four colors in practice.

After the color measurement processing for the calibration images for color conversion is finished, the projector 20 performs measurements of the luminance values of the calibration images for grayscale correction.

With grayscale correction, the projector 20 projects calibration images for grayscale correction that have two different grayscales (such as the 0 grayscale and 96 grayscale) in the lower region for white.

A calibration image with two different grayscales in the lower grayscale region is used because the effects of ambient light are more obvious at lower grayscales than higher ones. The description now turns to the relationship between input grayscales and output.

Figure 5A:
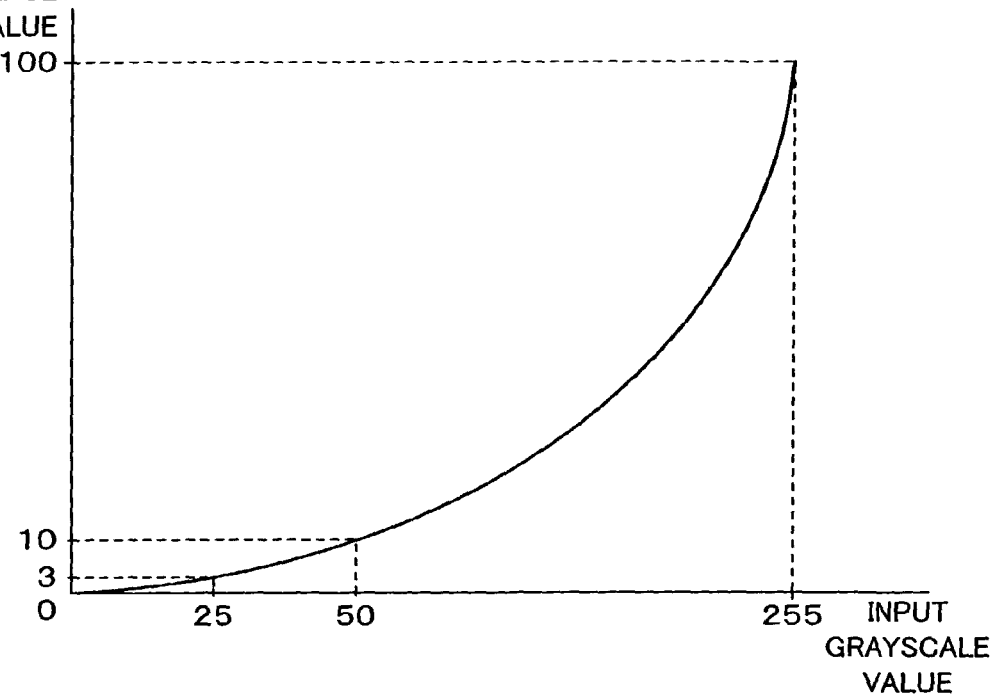
FIG. 5A is a schematic view of the relationship between input grayscales and the luminance value of the image display region when the ambient light has no effect and FIG. 5B is a schematic view of the relationship between input grayscales and the luminance value of the image display region when the ambient light does have an effect.
Figure 5B:
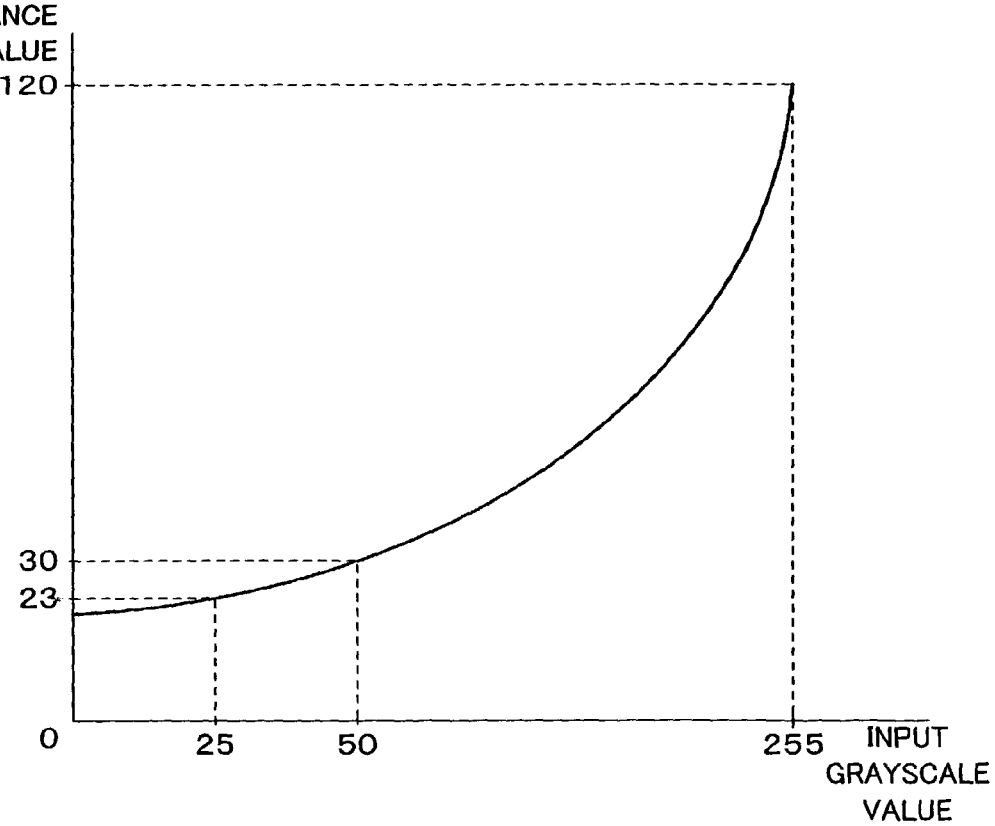

A schematic view of the relationship between input grayscales and the luminance value of the image display region 12 when the ambient light 80 has no effect is shown in FIG. 5A and a schematic view of the relationship between input grayscales and the luminance value of the image display region 12 when the ambient light 80 does have an effect is shown in FIG. 5B.

When the ambient light 80 has no effect and the grayscales range from 0 to 255, the luminance value at the highest grayscale (255) is 100, the luminance value at a lower grayscale (50) is 10, and the luminance value at another low grayscale (25) is 3, as shown by way of example in FIG. 5A.

When the ambient light 80 does have an effect and the grayscales range from 0 to 255, on the other hand, the luminance value at the highest grayscale (255) is 120, the luminance value at a lower grayscale (50) is 30, and the luminance value at another low grayscale (25) is 23, as shown in FIG. 5B.

In other words, when the ambient light 80 has an effect, the effect of the ambient light 80 adds 20 to each of the luminance values.

In such a case, the conversion ration for the 255 grayscale is: 120/100=1.2. Similarly, the conversion ration for the 50 grayscale is: 30/10=3.0. Furthermore, the conversion ration for the 25 grayscale is: 23/3=7.7.

Since the ambient light 80 is more likely to affect the lower grayscales than the higher grayscales in this manner, the projector 20 can determine the change in the environment accurately by determining the change in luminance value of a lower grayscale.

The description now turns to the flow of processing for grayscale correction.

The calibration signal generation section 150 determines which grayscale calibration image for grayscale correction to use (step S34), and generates calibration signals (R2, G2, and B2) in such a manner as to cause the display of the calibration images for grayscale correction in the thus-determined grayscale.

The color conversion section 120 uses the matrix for color conversion that has been set to its initial values to perform the color conversion, and outputs the R3 signal, G3 signal, and B3 signal. The grayscale correction section 170 uses the 1D-LUT that has been set to its initial values to perform grayscale correction, and outputs the R4 signal, G4 signal, and B4 signal.

The projector 20 projects the calibration images for grayscale correction based on the RGB signals that are output through the D/A converter section 180 and the L/V drive section 190 (step S36).

The color-light sensor 60 measures the luminance value of the calibration image for grayscale correction that is projected on the screen 10 (step S38).

The 1D-LUT generation section 140 stores measurement data (luminance value), based on the measurement information from the color-light sensor 60 (step S40).

The projector 20 repeats the measurement processing (steps S34 to S40) until the measurement of the calibration images for grayscale correction of all colors is finished (step S42). Note that this measurement processing (steps S34 to S40) is performed twice since there are two grayscales in practice.

Once all of the necessary measurement data has been gathered, the matrix generation section 130 generates a matrix for color conversion, which is a type of data for color conversion, (step S44) and stores it in the matrix storage section 122.

Note that this matrix for color conversion could be a 3×3 matrix for color conversion M that combines a matrix M1 that converts RGB signals into XYZ values and a matrix M2 that converts XYZ values into RGB signals for reproducing ideal colors, by way of example. Note that M=M2×M1.

The projector 20 can convert the RGB signals (R2, G2, B2) into RGB signals (R3, G3, B3) that reproduce colors suited to the environment, by using this matrix for color conversion M.

Once all of the necessary measurement data has been gathered, the 1D-LUT generation section 140 generates the 1D-LUT that is a type of grayscale correction data (step S46) and stores it in the 1D-LUT storage section 172.

Note that this 1D-LUT indicates the grayscale characteristic by gamma values based on measured luminance values, and one 1D-LUT is provided for each of R, G, and B.

With this embodiment, when the projector 20 performs gamma processing and grayscale correction, performs grayscale correction by using gamma parameters (a type of grayscale correction data) that differ between the lower grayscale region and the higher grayscale region, in such a manner that the width of increase of the output values is relatively greater in the lower grayscale region than in the higher grayscale region.

Figure 6:
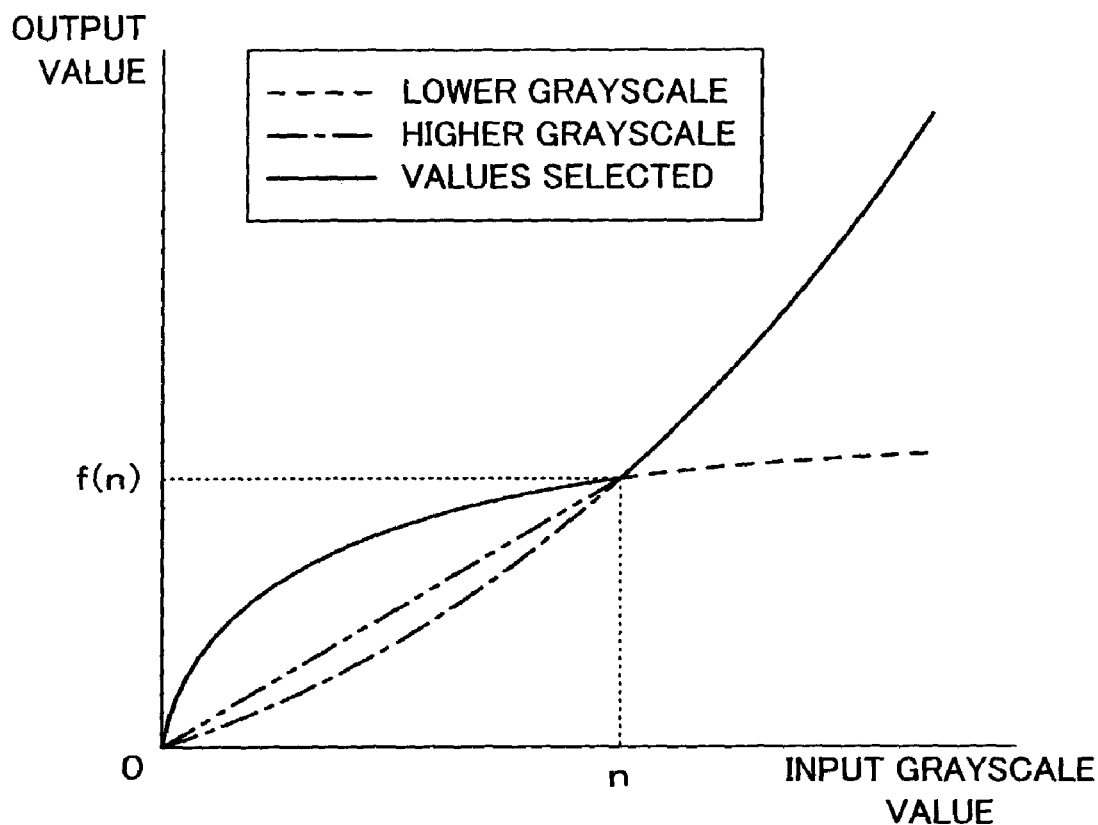
FIG. 6 is a schematic view of grayscale output after correction in accordance with an example of this embodiment.
Figure 7:
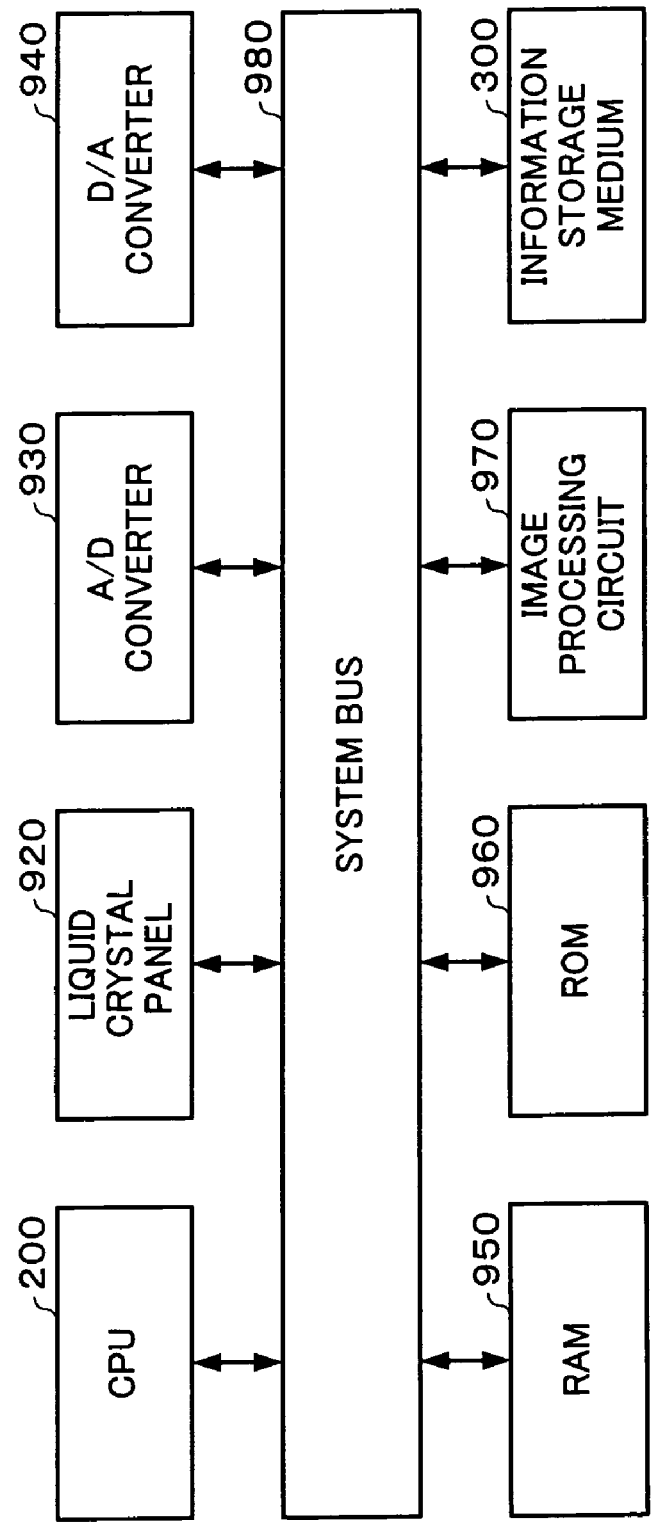
FIG. 7 is a hardware block diagram of the projector image processing section within the projector in accordance with this embodiment.

The graph of FIG. 6 is a schematic view of the output after grayscale correction in accordance with an example of this embodiment.

Assume, by way of example, that the luminance value when the first grayscale correction image for grayscale correction is measured under the ideal environment is L01, the luminance value when the second grayscale correction image for grayscale correction is measured under the ideal environment is L02, L02/L01=C0, the luminance value when the first grayscale correction image for grayscale correction is measured under the on-site environment is L11, the luminance value when the second grayscale correction image for grayscale correction is measured under the on-site environment is L12, L12/L11=C1, and C0/C1−1=α.

Note that these luminance values are those as measured by the color-light sensor 60, where L01 and L02 are examples of ideal environmental information that indicate the ideal environment and L11 and L22 are examples of on-site environmental information that indicate the environment in which the projector is used.

In this case, C0 indicates the ratio of luminance values under the ideal environment, C1 indicates the ratio of luminance values under the on-site environment, and a indicates the difference between the ideal environment and the on-site environment.

Assume also that the gamma correction value for the lower grayscale region is $\Delta\gamma L$, the gamma correction value for the higher grayscale region is $\Delta\gamma H$, the pre-correction gamma value is $\gamma$, the gamma value for the lower grayscale region after correction is $\gamma' L$, the gamma value for the higher grayscale region after correction is $\gamma' H$, the minimum gamma value for the lower grayscale region is $\gamma L$, the minimum gamma value for the higher grayscale region is $\gamma H$, the input grayscale is X, the output value is Y, the maximum output value for the lower grayscale region is WL, and the maximum output value for the higher grayscale region is WH.

In such a case, the output value for the lower grayscale region is expressed by: $Y=WL \times X^{}\gamma' L$. Similarly, the output value for the higher grayscale region is expressed by: $Y=WH \times X^{}\gamma' H$. Not that "**" means "to the power of".

In this case, WL=0.5 and WH=1.0. In addition, if a value that is less than 1 is used for the minimum gamma value $\gamma L$ of the lower grayscale region and a value greater than 1 is used for the minimum gamma value $\gamma L$ of the higher grayscale region, the conversion ratio for the input-output characteristics of the lower grayscale region decreases as the grayscale rises, and the conversion ratio for the input-output characteristics of the higher grayscale region increases in comparison to the lower grayscale region as the grayscale rises, as shown in FIG. 6.

Therefore, the curve that represents the input-output characteristic of the lower grayscale region and the curve that represents the input-output characteristic of the higher grayscale region intersect at a point (n, f (n)), as shown in FIG. 6.

With this embodiment, a curve that is higher than the output is used as the curve for the grayscale characteristic, as shown by the solid line in FIG. 6.

In this case, the projector 20 is adjusting the output in such a manner that the output value of the lower grayscale region is higher than a straight line connecting the origin (0, f(0)) and the intersection (n, f(n)) (the dot-dot-dash line in FIG. 6). The projector 20 controls breakdown of the lower grayscale portion by boosting the output to that degree, thus making it possible to reproduce an easy-to-see image.

Note that the above-described n is preferably a value that is half the maximum value of the input grayscales, in particular a value that is close to one-quarter thereof.

In this manner, the projector 20 can prevent the occurrence of breakdown in the lower grayscale region while controlling the occurrence of deteriorated tone-mapping of highlight details in the higher grayscale region, by using different gamma parameters for the lower grayscale region and the higher grayscale region so that the width of increase of the output values in the lower grayscale region are greater than those in the higher grayscale region, thus enabling more appropriate grayscale correction.

Note that in this case, $\gamma'L=\Delta\gamma L+\gamma$ and $\gamma'H=\Delta\gamma H+\gamma$. In addition, $\Delta\gamma L=-h\alpha/(1+|h\alpha|)\times(\gamma-\gamma L)$ and $\Delta\gamma H=-h\alpha/(1+|h\alpha|)\times(\gamma-\gamma H)$. Note also that h is a constant used for adjustment.

As described above, this embodiment enables the projector 20 to perform color conversion and grayscale correction with only four passes of the color measurement processing of the calibration images for color conversion and two passes of the color measurement processing of the calibration images for grayscale correction. The projector 20 can therefore perform calibration within a shorter time than in the prior art.

The projector 20 makes it possible to clarify any difference between the ideal environment and the on-site environment by using two grayscale images in the lower grayscale region as the calibration images for grayscale correction, and by performing grayscale correction using the ratio of luminance values of those two images as measured-color data. This enables the projector 20 to perform suitable grayscale correction with a small amount of data.

In addition, the projector 20 can perform color conversion with no narrowing of the maximum color gamut of the projector 20, by using images at the highest grayscale value as the calibration images for color conversion.

By using a matrix for color conversion when performing color conversion, instead of a 3D-LUT, the projector 20 can reduce the amount of storage required for the data for color conversion, in comparison with the case in which a 3D-LUT is used.

This embodiment also makes it unnecessary for the projector 20 to use complicated processing, such as linear interpolation during the color conversion, enabling rapid color conversion.

This embodiment also enables the projector 20 to project an image from consideration of the viewing environment, by using the color-light sensor 60 to determine the viewing environment.

This makes it possible for the projector 20 to display an image that is adapted to the viewing environment when the image is displayed, thus making it possible to absorb differences in display environment and display the same image regardless of environment. This therefore enables the projector 20 to reproduce substantially the same colors within a short time, at a plurality of different locations.

Description of Hardware

Note that the hardware described below by way of example can be used to implement the above described components.

For example, the A/D converter section 110 could be implemented by an A/D converter or the like; the D/A converter section 180 by a D/A converter or the like; the L/V drive section 190 by a liquid crystal light valve driver or the like; the matrix generation section 130, the color conversion section 120, the 1D-LUT generation section 140 and the grayscale correction section 170 by a CPU or the like; and the calibration signal generation section 150 by image processing circuitry and an ASIC or the like. Note that these components could be implemented in a hardware fashion by circuitry.

It is also possible to implement the functions of the components shown in FIG. 2 by reading out to a computer a program that causes the computer to function as means such as a display control means for providing control in such a manner that the above described calibration images for color conversion and the calibration images for grayscale correction are displayed on the image display means from an computer-readable information storage medium 300. The computer-readable information storage medium 300 could be a CD-ROM, DVD-ROM, ROM, RAM, or HDD, by way of example, and the method of reading the program therefrom could be a direct method or an indirect method.

Instead of the computer-readable information storage medium 300, it is possible to implement the above described functions by downloading a program that implements those functions, over a transfer path from a host device or the like.

A luminance sensor could be used for the color-light sensor 60, with amore specific description of the hardware being given below.

For example, the color-light sensor 60 could comprise a color filter and photodiode that selectively pass one of the stimulus values of the tristimulus values, an A/D converter that converts an analog signal from the photodiode into a digital signal, and an op amp that amplifies that digital signal.

The color-light sensor 60 can perform measurements even at a location that is separated from the screen 10, so that it can measure the luminance value of the projected image that is reflected from the screen 10, in other words, a luminance value that reflects not the ambient light 80 alone, but also the effects of the partial light reflectivity of the screen 10 and the distance from the screen 10.

The use of the color-light sensor 60 therefore makes it possible to determine the viewing environment in a more appropriate manner, in comparison with a method using an illumination sensor or the like. Since there need only be one sensor, costs are reduced.

Note the present invention has been described above by way of a preferred embodiment thereof, but the application of the present invention is not limited to the above embodying example.

Variant Examples

In the flowchart of FIG. 4, calibration images for color conversion and calibration images for grayscale correction are different, but it is also possible to use a grayscale correction color image that is in one of the colors of the calibration images for color conversion, and a calibration image for grayscale correction in that grayscale correction color but of a different grayscale.

Since this ensures that the projector 20 need only display a total of five calibration images for color measurement, the calibration can be done in an even shorter time. However, it should be noted that it is better to use a method by which the above described calibration images for color conversion and calibration images for grayscale correction are measured independently, to ensure maximization of color gamut and clear determination of grayscale changes.

A matrix for color conversion was used by the above described embodiment as data for color conversion, but it is equally possible to use other means such as a three-dimensional look-up table therefor. In other words, the color conversion section 120 could also perform color conversion by using means such as a three-dimensional look-up table.

Other than data obtained by measurement by the color-light sensor 60 at the actual location at which the projector 20 is set up, the above described data that indicates the ideal environmental information (such as L01 and L02) could be ideal data obtained by a sample device, with corrected values for that ideal data being installed in the projector 20 at the factory, by way of example.

The present invention can also be applied to situations such as presentations in which images are displayed by display means other than a projection type of image display device such as the above described projector 20. Instead of a liquid-crystal projector, a display device such as a projector using a digital micromirror device (DMD), a cathode ray tube (CRT), a plasma display panel (PDP), a field emission display (FED) device, an electro-luminescence (EL) device, or a direct-vision type of liquid crystal display device could be used as such a display means. Note that DMD is a trademark registered to Texas Instruments Inc. of the USA. In addition, the projector is not limited to a front-projection type; it could equally well be a rear-projection type of projector.

It should be obvious that the present invention would also be effective when displaying images in applications that are not presentations, such as in meetings, for medical treatment, in the design or fashion world, in business activities, commercials, and in education, as well as for general-purpose image displays such as movies, TV, video, and games.

In the above described examples, RGB signal values were used but the present invention can equally well be applied to the use of CMY values or CMYK values.

The visual environment determination means could be imaging means such as a CCD camera or a CMOS camera, instead of the color-light sensor 60.

The environment determination means could be imaging means such as a CCD camera or a CMOS camera, instead of the color-light sensor 60.

Note that the above-described screen 10 could be of a reflective type or a transmissive type.

Note also that the functions of the above-described projector image processing section 100 of the projector 20 could be implemented by a simple image display device (such as the projector 20 itself) or by distribution between a plurality of processing devices (such as distributed processing between the projector 20 and a PC).

In addition, the projector 20 and the color-light sensor 60 could be implemented as separate devices, or the could be configured as an integrated device

The invention claimed is:

1. An image display system comprising:
   image display means for displaying a first calibration image having a first grayscale value of a color and a second calibration image having a second grayscale value of the color, the first grayscale value and the second grayscale value being different from each other;
   environment determination means for capturing the first and second calibration images and ambient light so as to generate first and second luminance values corresponding to the respective first and second calibration images displayed on a display area being affected by the ambient light under an on-site environment; and
   grayscale correction means for performing grayscale correction based on a first ratio between the first and second luminance values, and based on a second ratio between third and fourth luminance values, the third and fourth luminance values corresponding to the respective first and second calibration images displayed on an area under an ideal environment.

2. The image display system as defined in claim 1, wherein the first and second grayscale values being less than a half value of an entire grayscale range.

3. The image display system as defined in claim 1, wherein the grayscale correction means comprises:
   means for generating a one-dimensional look-up table, based on the first difference; and
   means for performing gamma processing for the grayscale correction, based on the thus-generated one-dimensional look-up table.

4. The image display system as defined in claim 1, further comprising:
   color conversion means for performing color conversion, wherein the image display means displays the calibration images in R-color, G-color, B-color and white color each having a predetermined grayscale value, one of the calibration images in R-color, G-color, B-color and white color being one of the first calibration image and the second calibration image,
   the environment determination means captures the calibration images in R-color, G-color, B-color and white color so as to generate respective color information corresponding to the calibration images in R-color, G-color, B-color and white color displayed on the display area under the on-site environment, and
   the color conversion means performs the color conversion based on the respective color information.

5. The image display system as defined in claim 1, further comprising:
   color conversion means for performing color conversion, wherein the image display means displays the calibration images for the color conversion in R-color, G-color, B-color and white each having a higher grayscale value,
   the environment determination means captures the calibration images for the color conversion in R-color, G-color, B-color and white color so as to generate first and second information corresponding to the respective first and second calibration images displayed on the display area under on-site environment, and
   the color conversion means performs the color conversion, based on the respective color information.

6. The image display system as defined in claim 1, wherein the grayscale correction means performs gamma processing for the grayscale correction, using different gamma parameters for a lower grayscale region and a higher grayscale region, based on the first environmental information, and based on second environmental information corresponding to the calibration images displayed on an area under the ideal environment, in such a manner that a width of increase of output values is relatively greater in the lower grayscale region than in the higher grayscale region.

7. The image display system as defined in claim 6, wherein, where at least some of the gamma parameters are such that, constants are A and B, an output grayscale is Y, an input grayscale is X, a gamma value of the lower grayscale region is $\gamma L$, and a gamma value of grayscale regions other than the lower grayscale region is $\gamma H$;

$Y = AX^{\gamma L}$ is applied for the lower grayscale region, $Y = BX^{\gamma H}$ is applied for the higher grayscale region, γL is a value less than 1, and γH is a value equal to or greater than 1.

8. The image display system as defined in claim 6,
wherein the image display means displays a first calibration image having a first grayscale values of a single color and a second calibration image having a second grayscale value of the single color, the first grayscale value and the second grayscale value being different from each other,
wherein the environment determination means captures the first and second calibration images so as to generate the first environmental information, based on first and second information corresponding to the respective first and second calibration images displayed on the display area under on-site environment, and
wherein the grayscale correction means performs grayscale correction, based on the first environmental information and the second environmental information, based on third and fourth information, the third and fourth information corresponding to the respective first and second calibration images displayed on the area under the ideal environment.

9. An image display system:
an image display section that displays a first calibration image having a first grayscale value of a color and a second calibration image having a second grayscale value of the color, the first grayscale value and the second grayscale value being different from each other;
an environment determination section that captures the first and second calibration images and ambient light so as to generate first and second luminance values corresponding to the respective first and second calibration images displayed on a display being affected by the ambient light area under on-site environment; and
a grayscale correction section that performs grayscale correction, based on a first ratio between the first and second luminance values, and based on a second ration between third and fourth luminance values, the third and fourth luminance values corresponding to the respective first and second calibration images displayed on an area under an ideal environment.

10. A projector comprising:
image display means for projecting a first calibration image having a first grayscale value of a color and a second calibration image having a second grayscale value of the color, the first grayscale value and the second grayscale value being different from each other;
environment determination means for capturing the first and second calibration images and ambient light so as to generate first and second luminance values corresponding to the respective first and second calibration images projected on a display area being affected by the ambient light under on-site environment; and
grayscale correction means for performing grayscale correction, based on a first ratio between the first and second luminance values, and based on a second ratio between third and fourth luminance values, the third and fourth luminance values corresponding to the respective first and second calibration images projected on an area under an ideal environment.

11. The projector as defined in claim 10,
wherein the grayscale correction means performs gamma processing for the grayscale correction, using different gamma parameters for a lower grayscale region and a higher grayscale region, based on the first environmental information, and based on second environmental information corresponding to the calibration images displayed on an area under the ideal environment, in such a manner that a width of increase of output values is relatively greater in the lower grayscale region than in the higher grayscale region.

12. A projector comprising:
an image display section that projects a first calibration image having a first grayscale value of a color and a second calibration image having a second grayscale value of the color, the first grayscale value and the second grayscale value being different from each other;
an environment determination section that captures the first and second calibration images and ambient light so as to generate first and second luminance values corresponding to the respective first and second calibration images projected on a display area being affected by the ambient light under on-site environment; and
a grayscale correction section that performs grayscale correction, based on a first ratio between the first and second luminance values, and based on a second ratio between third and fourth luminance values, the third and fourth luminance values corresponding to the respective first and second calibration images projected on an area under an ideal environment.

13. A computer-readable information storage medium storing a program causing a computer to function as:
display control means for causing image display means to display a first calibration image having a first grayscale value of a color and a second calibration image having a second grayscale value of the color, the first grayscale value and the second grayscale value being different from each other;
environment determination means for capturing the first and second calibration images and ambient light so as to generate first and second luminance values corresponding to the respective first and second calibration images displayed on a display area being affected by the ambient light under on-site environment; and
grayscale correction means for performing grayscale correction, based on a first ratio between the first and second luminance values, and based on a second ratio between third and fourth luminance values, the third and fourth luminance values corresponding to the respective first and second calibration images displayed on an area under an ideal environment.

14. The computer-readable information storage medium as defined in claim 13,
wherein the first and second grayscale values being less than a half value of an entire grayscale range.

15. The computer-readable information storage medium as defined in claim 13,
wherein the first, second, third and fourth information being expressed as luminance values; and
the first difference and the second difference being expressed as ratios of luminance values.

16. The computer-readable information storage medium as defined in claim 13, wherein the grayscale correction means comprises:
means for generating a one-dimensional look-up table, based on the first difference; and
means for performing gamma processing for the grayscale correction, based on the thus-generated one-dimensional look-up table.

17. The computer-readable information storage medium as defined in claim 13, storing:
- a program for causing a computer to function as color conversion means for performing color conversion,
- wherein the display control means causes the image display means to display the calibration images in R-color, G-color, B-color and white color each having a predetermined grayscale value, and one of the calibration images in R-color, G-color, B-color and white color, being one of the first calibration image and the second calibration image,
- the environment determination means captures the calibration images in R- color, G-color, B-color and white color so as to generate respective color information corresponding to the calibration images in R-color, G-color, B-color and white color displayed on the display area under the on-site environment, and
- the color conversion means performs the color conversion based on the respective color information.

18. The computer-readable information storage medium as defined in claim 13, storing:
- a program for causing a computer to function as color conversion means for performing color conversion,
- wherein the display control means causes the image display means to display the calibration images for the color conversion in an R-color, G-color, B-color and white color each having a higher grayscale value,
- the environment determination means captures the calibration images for the color conversion in R-color, G-color, B-color and white color is displayed, so as to generate first and second information corresponding to the respective first and second calibration images displayed on the display area under on-site environment, and
- the color conversion means performs the color conversion based on the respective color information.

19. The computer-readable information storage medium as defined in claim 13,
- wherein the grayscale correction means performs gamma processing for the grayscale correction, using different gamma parameters for a lower grayscale region and a higher grayscale region, based on the first environmental information, and based on second environmental information corresponding to the calibration images displayed on an area under the ideal environment, in such a manner that a width of increase of output values is relatively greater in the lower grayscale region than in the higher grayscale region.

20. The computer-readable information storage medium as defined in claim 19,
- wherein, where at least some of the gamma parameters are such that, constants are A and B, an output grayscale is Y, an input grayscale is X, a gamma value of the lower grayscale region is γL, and a gamma value of grayscale regions other than the lower grayscale region is γH; $y = AX^{\gamma L}$ is applied for the lower grayscale region, $Y = BX^{\gamma H}$ is applied for the higher grayscale region, γL is a value less than 1, and γH is a value equal to or greater than 1.

21. An image processing method comprising:
- displaying calibration images for color conversion in different colors;
- capturing the calibration images in different colors so as to generate respective color information corresponding to the calibration images for the color conversion;
- displaying a first calibration image having a first grayscale value of a color and a second calibration image having a second grayscale value of the color, the first grayscale value and the second grayscale value being different from each other for performing grayscale correction;
- generating first and second luminance values by capturing the first and second calibration images and ambient light corresponding to the respective first and second calibration images displayed on a display area being affected by the ambient light under on-site environment and third and fourth luminance values corresponding to the respective first and second calibration images displayed on an area under the ideal environment;
- performing the grayscale correction, based on a first ratio between the first and second luminance values, and based on a second ratio between the third and fourth luminance values.

22. The image processing method as defined in claim 21, further comprising:
- displaying calibration images for grayscale correction;
- determining luminance values of the thus-displayed calibration images for the grayscale correction; and
- performing gamma processing for the grayscale correction, using different gamma parameters for a lower grayscale region and a higher grayscale region, based on first environmental information that is based on a luminance value that is determined when the calibration images are displayed under the ideal environment and second environmental information that is based on a luminance value that is determined when the calibration images are displayed under on-site environment, in such a manner that a width of increase of output values is relatively greater in the lower grayscale region than in the higher grayscale region,
- wherein, where at least some of the gamma parameters are such that, constants are A and B, an output grayscale is Y, an input grayscale is X, a gamma value of the lower grayscale region is γL, and a gamma value of grayscale regions other than the lower grayscale region is γH; $Y = AX^{\gamma L}$ is applied for the lower grayscale region, $Y = BX^{\gamma H}$ is applied for the higher grayscale region, γL is a value less than 1, and γH is a value equal to or greater than 1.

23. An image display system comprising:
- an image display section that displays calibration images;
- an environment determination section that determines on-site environment being affected by ambient light in which the image display section is used and generates on-site environmental information which indicates the on-site environment; and
- a grayscale correction section that performs grayscale correction based on the on-site environmental information;
- wherein the image display section displays the calibration images and also displays an image that has been subjected to the grayscale correction,
- the environment determination section captures the calibration images and the ambient light and generates two types of the on-site environmental luminance values, and
- the grayscale correction section performs the grayscale correction, based on a first ratio between two types of ideal environmental luminance values that indicates an ideal environment corresponding to the respective two types of the on-site environmental information, and based on a second ratio between the two types of the on-site environmental luminance values.

24. A projector comprising:
- an image display section that displays calibration images;
- an environment determination section that determines on-site environment being affected by ambient light in which the image display section is used and generates on-site environmental information which indicates the on-site environment; and a grayscale correction section that performs grayscale correction based on the on-site environmental information;

wherein the image display section displays the calibration images and also displays an image that has been subjected to the grayscale correction, the environment determination section captures the calibration images and the ambient light and generates two types of the on-site environmental luminance values, and the grayscale correction section performs the grayscale correction, based on a first ratio between two types of ideal environmental luminance values that indicates an ideal environment corresponding to the respective two types of the on-site environmental information, and based on a second ratio between the two types of the on-site environmental luminance values.

* * * * *